United States Patent [19]

Lee

[11] Patent Number: 4,943,747
[45] Date of Patent: Jul. 24, 1990

[54] BRUSHLESS UNEQUAL POLES CONTROLLED ELECTRIC MOTOR

[75] Inventor: Jong-Seob Lee, Jinju Apartment No. 5-1305, Gazoa-dong 30-2, Seo-ku, InChon, Rep. of Korea

[73] Assignees: Woo-Jin Kim, Seoul; Jong-Seob Lee, Inchon, both of Rep. of Korea

[21] Appl. No.: 347,999

[22] Filed: May 5, 1989

[30] Foreign Application Priority Data

Sep. 12, 1988 [KR] Rep. of Korea ......... 11757/1988[U]
Sep. 12, 1988 [KR] Rep. of Korea ......... 11758/1988[U]

[51] Int. Cl.$^5$ .................. H02K 29/08; H02K 3/18; H02P 1/22
[52] U.S. Cl. .................. 310/67 R; 310/186; 318/138; 318/439
[58] Field of Search .............. 310/67 R, 186, 254, 310/269; 318/138, 254, 439

[56] References Cited

U.S. PATENT DOCUMENTS 3,898,544  8/1975  Tanikoshi ............ 318/439
4,551,658  11/1985  Rhee ................. 310/186
4,704,567  11/1987  Suzuki et al. ........ 318/138

FOREIGN PATENT DOCUMENTS 58-89055  5/1983  Japan ................ 318/254

Primary Examiner—Peter S. Wong
Assistant Examiner—D. L. Rebsch
Attorney, Agent, or Firm—Marshall & Melhorn

[57] ABSTRACT

A brushless unequal-pole electric motor includes a cylindrical rotor formed at least partly of a permanent magnet and rotatably installed within a casing, a plurality of field magnetic cores installed within the cylindrical rotor, field coils wound around the field magnetic cores for magnetizing the cores, and position-detecting sensors for detecting the positions of the magnetic poles of the cylindrical rotor. The sensors are connected to driving circuits for reversing the magnetic fields, to cause the rotor to rotate. The field magnetic cores generate magnetic fields of different magnitudes between the adjacent field magnetic cores, and generate magnetic fields of the same magnitude as that of the oppositely located field magnetic cores. In an alternate embodiment, the field magnetic cores surround the rotor.

11 Claims, 3 Drawing Sheets

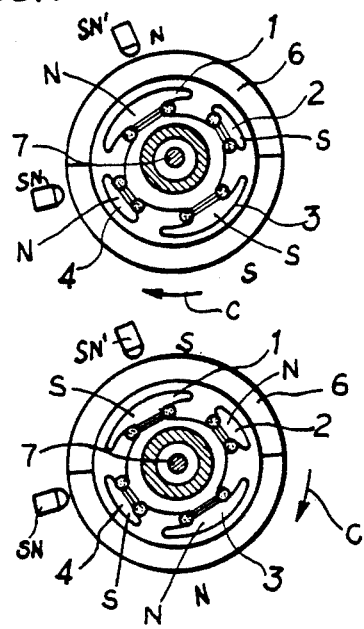
FIG.3A
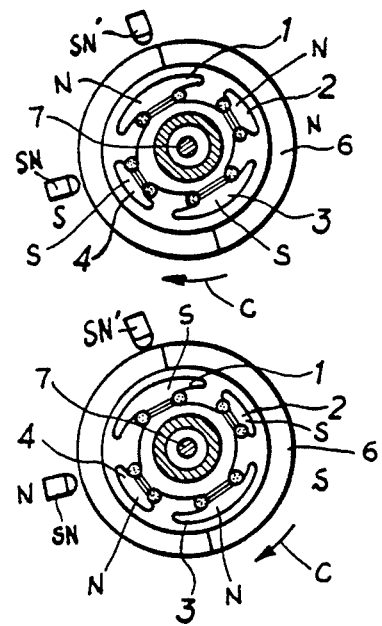
FIG.3B
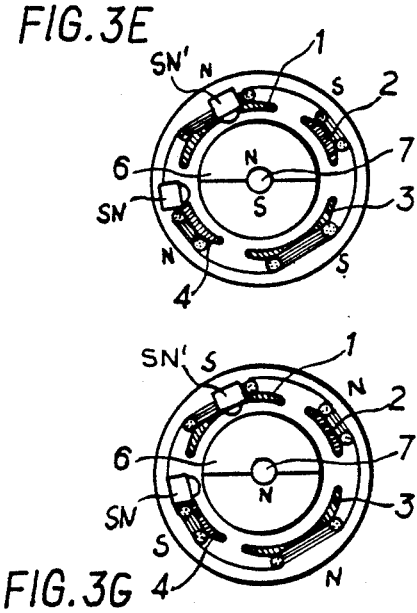
FIG.3C
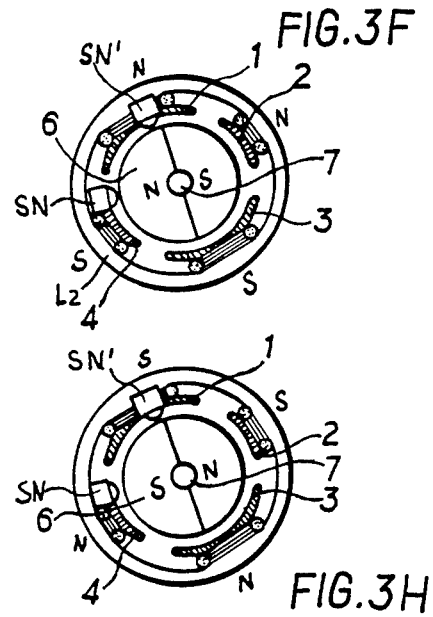
FIG.3D
FIG.3E
FIG.3F
FIG.3G
FIG.3H

BRUSHLESS UNEQUAL POLES CONTROLLED ELECTRIC MOTOR

FIELD OF THE INVENTION

The present invention relates to a brushless dc motor. and particularly to a brushless electric motor having a control circuit which reverses the polarity of its field coils in response to the sensed angular position of its rotor.

BACKGROUND OF THE INVENTION

In conventional permanent magnet dc motors, field magnets are installed within the casing and a rotor is rotatably supported on a shaft surrounded by the magnets. Such electric motors are constructed such that coils are wound on the rotor for establishing magnetic fields, and therefore, a commutator is required for supplying electric current to the coils of the rotor. Electric power is applied to the coils through a brush in contact with segments of the commutator as the rotates. But, in such a type of electric motor, the disadvantage is seen that the contacting portions between the commutator and brush are damaged due to the frictions generated by the revolving motion of the commutator.

Therefore, the need for a contactless or brushless type electric motor has arisen. In the brushless type electric motors thus proposed, permanent magnets are used in the rotor, and the rotor is made to turn by repeatedly reversing the magnetic poles of the field magnetic cores. This type of motor is described in Korean Patent Application No. 86,2085. The invention discloses a multiphase bipolar brushless dc motor by providing that each phase has an independent driving circuit (electronic commutator), an independent field coil and an independent position sensor, in such a manner that the respective phases are parallelly connected to a common dc power source, and each sensor is arranged at the interval of a shaft angle (($2\pi$/number of poles)/number of phases). The electrical position of the rotor is detected by sensors for the respective electrical phases to supply signals to the respective driving circuits to cause currents to flow through the coils of the respective phases. Thus, in order to make the motor efficiently revolve, the position of the sensor plate and the sensor is detected, and at least three or more phases are provided so that the electric angle ($\pi$/number of phases) will be determined by the number of the phases, and that the torque ripple will be improved accordingly as the number of the phase is increased.

However, in such an electric motor, the number of the field magnetic cores is increased, and at least three or more phases of electric current are required. Further, it has an independent driving circuit for each phase, and therefore. the construction of the motor is very complicated, as well as the starting being difficult.

SUMMARY OF THE INVENTION

Therefore, it is an object of the present invention to provide a brushless electric motor in which the driving circuit for the field magnetic cores is very simple.

It is another object of the present invention to provide a brushless electric motor in which the revolving torque is very large.

It is still another object of the present invention to provide a brushless electric motor in which the starting can be made very speedily.

In achieving the above objects of the present invention, the electric motor according to the present invention comprises a cylindrical rotor consisting at least partially of a permanent magnet and installed within a casing, a plurality of field magnetic cores installed within the cylindrical rotor, field coils wound around the field magnetic cores for magnetizing the said cores, and position, detecting sensors for detecting the positions of the magnetic poles of the rotor.

The field magnetic cores enclosed within the cylindrical rotor are provided in even numbers, and the field magnetic cores are disposed in such a manner that the adjacent cores generate opposite magnetic poles due to the opposite flowing directions of the electric currents through the field coils. That is, if one of the adjacent cores generates a positive (+) followed by a negative (−) magnetic pole, the other one will produce a negative (−) followed by a positive (+) magnetic pole. Further, in order to achieve a speedy starting and to make the revolution speed uniform, the adjacent field magnetic cores are constructed such that they generate magnetic fields of different magnitudes from each other.

Such magnetic fields of different magnitudes can be obtained by forming the field magnetic cores in different sizes, or varying the numbers of turns of coils for different cores.

However, the oppositely located cores facing each other generate magnetic fields of the same magnitude in order to make the revolution of the rotor uniform.

The position-detecting sensors for detecting the magnetic positions of the rotor are provided in even numbers, and can be installed on the inner face of the side wall of the motor casing.

A driving circuit for reversing the electric phase in response to the output of the position-detecting sensors is provided externally to the electric motor. The determination of the position of such a driving circuit is not related to the mechanical structure of the electric motor.

Therefore, in such an electric motor constructed as described above, if the initial electric currents are supplied for starting the motor, then the position of the magnetic pole of the rotor is detected by one of the position-detecting sensors, and the field magnetic cores are magnetized by the electric currents flowing through the coils of the cores. At this point, the magnetic poles of the field magnetic cores are established in polarities opposite from the poles of the permanent magnet of the rotor, and therefore, the repulsing forces generated between the field magnetic cores and the permanent magnet of the rotor will start the rotation of the rotor.

If the rotor is slightly revolved, then the position of the magnetic pole of the rotor is detected by another position-detecting sensor, and an electric current is supplied again to the field magnetic cores to magnetize them in such a manner that the field magnetic cores and the permanent magnet of the rotor generate repulsing forces between them, thereby making the revolution of the rotor continue. Further, the magnetic fields produced by the adjacent field magnetic cores are different in their magnitudes from each other, and therefore, non-uniform magnetic fields are formed within the electric motor, thereby facilitating the revolution of the electric motor. Further the dead point which is seen in the conventional electric motors (the dead point being defined as the point at which the magnetic fluxes from the field coil and from the rotor rectangularly cross each other, or exist parallelly together, so that no revolving force can occur) does not occur in the electric motor according to the present invention, thereby making the revolution speed of the motor uniform.

BRIEF DESCRIPTION OF THE DRAWINGS

The above objects and advantages of the present invention will become more apparent by describing the preferred embodiment of the present invention in more detail with reference to the attached drawings in which:

FIGS. 3A, 3B, 3C and 3D show the electric motor of FIG. 2A in four positions of rotation;

FIGS. 3E, 3F, 3G and 3H show the electric motor of FIG. 2B in four positions of rotation;

DESCRIPTION OF THE PREFERRED EMBODIMENT

Now the technical details of the present invention will be described based on the preferred embodiment of the present invention.

Figure 1:
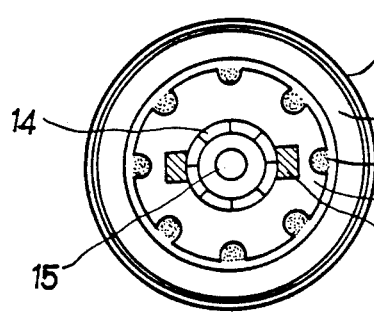
FIG. 1 is a cross-sectional end view of a prior art conventional dc motor.

First referring to FIG. 1 in which a conventional dc motor is illustrated, the construction is such that a field magnet 10 is installed inside a casing 9, and a rotor 12 having a shaft 15 is rotatably supported inside the magnet 10. The rotor 12 is provided with rotor coils 11, so that the rotor will generate magnetic fields. The supplying of the electric current to the rotor coils 11 is accomplished by a brush 13 and a commutator 14 mounted on the shaft 15 through the moving contact between the brush 13 and the segments of the commutator 14.

In such a conventional electric motor, sparks are generated as the commutator segments come into and move out of contact with the brush, and therefore, the commutator can be damaged. Further, dynamic power is obtained through the revolution of the rotor, and therefore, the diameter of the motor has to be increased if a large dynamic power is to be obtained, while in servo motors, the axial length of the rotor is increased. All these features require an increase of the total volume of the motor. Further, the sparks generated in the commutator produce noise, and render the motor susceptible to frequent damage, thereby requiring maintenance of the motor. Furthermore, the bulk of the motor limits its miniaturization for use in automated precision apparatuses.

Figure 2A:
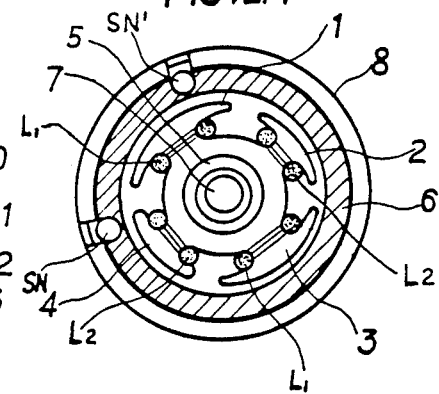
FIG. 2A is a cross-sectional end view of a brushless unequal-pole electric motor according to the present invention.

Now the construction of an electric motor according to the present invention will be described in detail. As shown in FIG. 2A, a brushless unequal-pole electric motor comprises a cylindrical rotor consisting at least partly of a permanent magnet and installed within a casing, a plurality of field magnetic cores installed within the cylindrical rotor, field coils wound around the field magnetic cores for magnetizing the cores, and position-detecting sensors for detecting the positions of the magnetic poles of the cylindrical rotor. The special feature of the electric motor is that the cylindrical rotor is disposed at the outside of the stator consisting of a plurality of field magnetic cores, but is disposed within the casing. The field magnetic cores are of different sizes to produce magnetic fields of different magnitudes between the adjacent field magnetic cores, and produce magnetic fields of the same magnitude as that of the oppositely located field magnetic cores. Therefore, the construction of an electronic driving circuit for the field coils can be very simple.

Referring to FIG. 2A, a casing 8 encloses a cylindrical rotor 6 formed by a permanent magnet mounted on a rotatably supported shaft 7. Stationary field magnetic cores 1, 2, 3 and 4, consisting of four projecting cores of two different sizes, are mounted on an axially projecting cylinder 5, and are provided with field coils L1 and L2, the field coils L1 for the field magnetic cores 1 and 3 and the field coils L2 for the field magnetic cores 2 and 4. Electrical power is supplied to the two sets of coils L1 and L2 to generate opposite magnetic polarity during the operation of the electric motor.

Miniature magnetic sensors SN and SN' are mounted at positions inside and adjacent the side wall of the casing 8 in such a manner that the sensors can detect the positions of the magnetic poles of the rotor, the relative position between the magnetic sensors being determined by the number of the field magnetic cores or by the number of the field magnetic poles. As shown in FIG. 2A, the sensors are approximately ninety degrees apart and are arcuately spaced from a longitudinal axis of an associated one of the field magnetic cores.

FIGS. 2, 3 and 4 show four field magnetic cores and a single N pole and a single S pole for the rotor, but the number of these components together with the position and the number of the magnetic sensors can be varied depending on the required torque and the application.

Figure 2B:
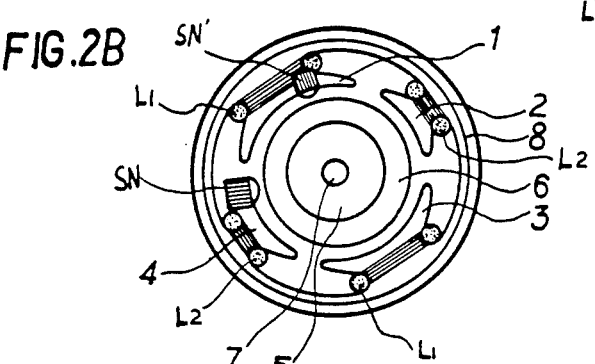
FIG. 2B is a cross-sectional end view of another embodiment of the electric motor shown in FIG. 2A.

FIG. 2B shows an alternate embodiment of the motor shown in FIG. 2A wherein the field magnetic cores 1 through 4 with the field coils L1 and L2 are mounted on the interior wall of the casing and the rotor 6 is formed by a permanent magnet on the cylinder 5 mounted on the shaft 7. The magnetic sensors SN and SN' are positioned adjacent the cores 4 and 1 respectively. The motors of FIGS. 2A and 2B are similar in operation including the electric polarities of the field coils L1 and L2 and the timing of the reversal of the polarities of the electric currents.

If the magnetic sensors SN and SN' are approached by the S pole of the rotor, they will emit a (+) positive polarity pulse of a sine wave pattern, while, if they are approached by the N pole of the rotor, their emission will be reversed to a (−) negative polarity pulse.

Figure 2C:
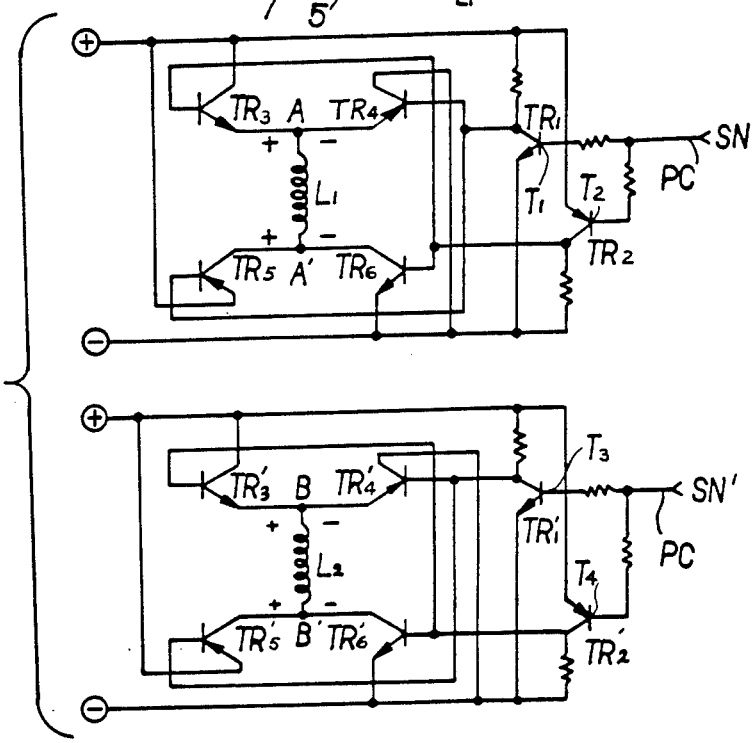
FIG. 2C is a schematic diagram of the magnetic control circuits for the electric motors shown in FIGS. 2A and 2B.

A control circuit for the motor according to the present invention is shown schematically in FIG. 2C. Trigger gates T1 through T4 are for triggering switching gates TR3 through TR6 and TR3' through TR6', and are operated by the pulse phase of the magnetic sensors. Thus, if the pulse phase of the magnetic sensor is positive (+). the trigger gates T1 and T3 are turned on to generate a negative polarity (−) output, while the gates T2 and T4 are maintained turned off.

On the other hand, if the phase of the pulse of the magnetic sensor is negative (−), the trigger gates T2 and T4 are turned on generate a positive (+) potential, while the other trigger gates T1 and T3 are maintained turned off. Therefore, if the phase of the sensor is positive (+), the gates T1 and T3 are turned on, and the gates T2 and T4 are turned off, while, if the phase of the sensor is a negative polarity (−), the gates T2 and T4 are turned on, and the gates T1 and T3 are turned off.

The switching gates TR3 through TR6 and TR3' through TR6' are formed by transistors and SCRs (switching elements). and the gates TR3, TR3', TR6 and TR6' are driven when the trigger gates T2 and T4 are in a turned on and amplifying state, that is, when the phase of the pulse of the magnetic sensor is negative (−). Thus, the field coils are connected to a source of electric power such that the electric polarity at the point A of the field coil L1 becomes positive (+), and the electric polarity at the point A' becomes negative (−). while the electric polarity at the point B of the field coil L2 also becomes positive (+), and the electric polarity at the point B' becomes negative (−).

On the other hand, if the N pole of the rotor departs from the position of the magnetic sensor, and if the S pole of the rotor approaches the magnetic sensor, then the phase of the magnetic sensor is reversed from negative (−) to positive (+), so that the gates T2 and T4 are maintained in the turned off state, and the gates T1 and T3 are reversed or turned on, with the result that the switching gates TR4, TR4', TR5 and TR5' are triggered. Accordingly, switchings are made at the opposite end of the field coils L1 and L2 in such a manner that the electric polarities at the points A and B will become negative (−), and the electric polarities at the points A' and B' will become positive (+). Thus, if the magnetic sensor is approached by the S pole of the rotor, then the switching gate TR4 and the switching gate TR5 are respectively switched over to a positive (+) current and a negative (−) current, while, if the magnetic sensor is approached by the N pole of the rotor, then the switching gate TR3 and the switching gate TR6 are respectively switched over to a positive (+) phase and to a negative (−) phase. Thus, the electric polarities at the opposite ends of the field coil L1 are determined by the phase of the pulse of the magnetic sensor.

Also, in the case of the magnetic sensor SN'. if this sensor is approached by the S pole of the rotor, then the switching gate TR4' and the switching gate TR5' are respectively switched over to a positive (+) current and a negative (−) current, while if the magnetic sensor SN' is approached by the N pole of the rotor, then the switching gate T3' and the switching gate TR6' are respectively switched over to a positive (+) current and to a negative (−) current. Thus, the electric polarities at the opposite ends of the field coil L2 are determined by the phase of the pulse of the magnetic sensor SN'.

As shown in FIGS. 2A and 2C, the field coils L1 wound on the field magnetic cores 1 and 3 and the field coils L2 wound on the field magnetic cores 2 and 4 are respectively capable of reversing their polarities, so that the magnetic polarities of the field magnetic cores are determined by the angular position of the rotor, thereby making the rotor 6 continuously revolve.

In contrast to the conventional motor in which the speed is controlled through the controlling of the applied voltage, the electric motor according to the present invention can control the revolution speed simply by delaying the timing of the phase of the pulse emitted by the magnetic sensors, and therefore, a difference of torque is not seen between the very high revolution speed and the very low revolution speed.

An external control terminal PC is provided for carrying out the controlling of the revolution speed and the revolution direction, and if it is required to operate a plurality of motors at the same revolution speed and in the same revolution direction, only one of the electric motors need be provided with the magnetic sensors SN and SN' so that the pulses from these magnetic sensors can be supplied through the external connection terminals PC to all the rest of the electric motors to obtain the same revolution speed and the same revolution direction in all of the involved electric motors.

The actuation states of the above described brushless unequal-pole electric motor, operated based on the above described principle, are shown in FIG. 3.

FIG. 3A illustrates a state in which the magnetic sensor SN is approached by the S pole of the rotor 6 and the magnetic sensor SN' is approached by the N pole of the rotor. Therefore, as shown in FIG. 2C, in which the electric polarities at the opposite ends of the field coil L1 are determined by the phase of the pulse of the magnetic sensor SN, the trigger gate T1 is turned on to trigger the switching gates TR4, TR5 because the pulse phase of the magnetic sensor SN is positive (+). Thus, switchings are made at the opposite ends of the field coil L1 in such a manner that the electric polarity at the point A of the field coil L1 becomes negative (−), and the electric polarity at the point A' becomes positive (+). Further, the field coils L1 are wound on the field magnetic cores 1 and 3 in such a manner that if the points A and A' have respectively a negative (−) polarity and a positive (+) polarity, then the field magnetic core 1 establishes an N pole and the field magnetic core 3 establishes an S pole. Therefore, if the magnetic sensor SN is approached by the S pole of the rotor, then field magnetic core 1 and the field magnetic core 3 are magnetized to produce respectively the N pole and the S pole.

If the magnetic sensor SN' is approached by the N pole of the rotor, the magnetic sensor SN' will emit a pulse of a negative (−) phase. Therefore, as shown in FIG. 2C, the trigger gate T4 is turned on to trigger the switching gates TR3' and TR6". Thus, the switchings are made in such a manner that the electric polarity at the point B of the field coil L2 becomes positive (+), and the electric polarity at the point B' becomes negative (−), with the result that the field magnetic core 2 and the field magnetic core 4 are magnetized to establish the S pole and N pole respectively due to the direction of the current flowing through the field coils L2.

Thus, as shown in FIG. 3A, the field magnetic cores 1. 2, 3 and 4 are magnetized to establish the N, S. S and N poles respectively, and therefore, the field magnetic cores 1 and 3 will undergo repulsing interactions with the permanent magnet poles of the rotor, while the field magnetic cores 2 and 4 will undergo attracting interactions with the permanent magnet poles of the rotor, because of the polarity of the field magnetic cores and the adjacent permanent magnet poles But the field magnetic cores are fixedly secured to the casing, and therefore, the rotor 6 will revolve together with the shaft 7 in the direction of an arrow C.

FIG. 3B shows a state in which the S pole of the rotor 6 is adjacent to both of the magnetic sensors SN and SN'. Here, the pulse phase of the magnetic sensor SN is positive (+) which should produce the same electric polarity as that of the field coil L1 of FIG. 3A, and therefore, the field magnetic core 1 and the field magnetic core 3 are magnetized to establish the N and S poles respectively.

However, as for the field magnetic cores 2 and 4, because the phase of the pulse of the magnetic sensor SN' is positive (+), the trigger gate T3 is turned on to trigger the switching gates TR4' and TR6", thereby making the electric polarity at the point B' of the field coil L2 become positive (+). and the electric polarity at the point B become negative (−). Thus, due to the direction of the electric current flowing through the field coil L2 wound on the field magnetic cores 2 and 4, the field magnetic cores 2 and 4 are magnetized to establish magnetic poles opposite to those of FIG. 3A, making the polarities of the field magnetic cores 2 and 4 become N and S respectively in FIG. 3B. Therefore, the field magnetic core 1 having the N pole exerts a repulsing force against the N pole of the rotor 6, and at the same time, attracts the center of the S pole of the rotor toward itself, while the field magnetic core 3 having the S pole exerts a repulsing force against the S pole of the rotor, and at the same time, attracts the center of the N pole of the rotor.

Furthermore, the field magnetic cores 2 and 4, both of which have the same polarity as the polarity of the adjacent rotor, will exert repulsing forces against the poles of the rotor, and simultaneously due to the actions of the field magnetic cores 1 and 3, the shaft 7 will continue to revolve in the direction of the arrow C. FIG. 3C illustrates a state in which the angular position of the rotor is oppositely located compared with the position of FIG. 3A. Here, the magnetic sensor SN is approached by the N pole of the rotor. and therefore, the phase of the pulse of the magnetic sensor SN is negative (−), while the phase of the pulse of the magnetic sensor SN' is positive (+), because the magnetic sensor SN' is approached by the S pole of the rotor.

Therefore, the field magnetic cores 2 and 4 are magnetized to establish the N and S poles respectively, that is, in the same polarities as those of FIG. 3B. Further, because the phase of the pulse of the magnetic sensor SN is negative (−), the trigger gate T2 is turned on to trigger the switching gates TR3 and TR6, thereby switching the electric polarity at the point A of the field coil L1 to become positive (+). and the electric polarity at the point A' to become negative (−). Thus, the electric current will flow through the field coil L1 in the direction opposite to that of FIG. 3B, and therefore, the field magnetic cores 1 and 3 will be magnetized to establish the S and N poles respectively.

At this point, because the field magnetic cores 2 and 4 are magnetized to establish the N and S poles respectively, the field magnetic core 1 having the same polarity as that of the rotor will repulse the rotor, the field magnetic core 2 will attract the S pole of the rotor, the field magnetic core 3 having the N pole will repulse the N pole of the rotor, and the field magnetic core 4 having the S pole will attract the N pole of the rotor, thus making the rotor 6 and the shaft 7 revolve in the direction of the arrow C. From the above state, if the N pole of the rotor approaches the magnetic sensor SN', then the electric polarity of the field coil L2 is reversed.

Under the condition of FIG. 3D, the poles of the rotor are oppositely located compared with the position of FIG. 3B. and the N pole of the rotor is adjacent to both the magnetic sensors SN and SN', so that all the phases of the pulses of the magnetic sensors will become negative (−).

Here, the pulse phase of the magnetic sensor SN is negative (−), as mentioned above, and therefore, the trigger gate T2 is turned on to trigger the switching gates TR3 and TR6, thereby causing the electric polarity at the point A of the field coil L1 to become positive (+), and the electric polarity at the point A' to become negative (−), with the result that the field magnetic cores 1 and 3 are magnetized to establish the S and N poles respectively.

Meanwhile, the pulse phase of the magnetic sensor SN' is also negative (−), and therefore, the trigger gate T4 is turned on to trigger the switching gates TR3' and TR6". thereby causing the electric polarity at the point B of the field coil L2 to become positive (+), and the electric polarity at the point B' to become negative (−). Therefore, the field magnetic cores 2 and 4 are magnetized to establish the S and N poles respectively, and accordingly, the field magnetic core 1 having the S pole repulses the S pole of the rotor, attracting at the same time the N pole of the rotor, the field magnetic core 2 having the S pole repulses the S pole of the rotor to push it to the position of the filed magnetic core 3, and the field magnetic core 3 having the N pole repulses the N pole of the rotor to push it to the position of the field magnetic core 4, attracting at the same time the S pole of the rotor.

The field magnetic core 4 having the N pole will repulse the N pole of the rotor, and thus, the interacting directions of the field magnetic cores 2 and 4 are same as those of the field magnetic cores 1 and 3. Accordingly, the rotor 6 together with the shaft 7 will revolve in the direction of the arrow C. The actuations illustrated respectively in FIGS. 3A, 3B, 3C and 3D will be repeated, and therefore, the brushless unequal-pole electric motor according to the present invention will revolve continuously.

FIGS. 3E through 3H show the motor of FIG. 2B in the same states of operation as are shown in FIGS. 3A through 3D. However, the rotor 6 of the motor shown in FIG. 2B rotates inside the field magnetic cores 1 through 4 rather than outside them as does the rotor of the motor shown in FIG. 2A.

Figure 4A:
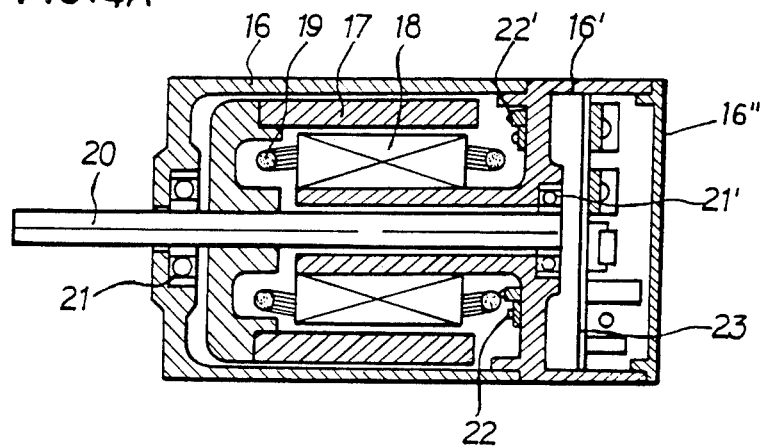
FIG. 4A is a cross-sectional side view of an electric motor similar to the motor shown in FIG. 2A.

A brushless unequal-pole electric motor, similar to the motor shown in FIG. 2A and based on the above described principles, is shown in FIG. 4A. Field magnetic cores 18 which are adapted to receive field coils 19 are mounted on an inner circumferential extension of an interior wall of a rear casing portion 16'. Bearings 21 and 21' are fitted to the centers of the front end wall of a front casings portion 16 and the interior wall of the rear casing portion 16' to rotatably support a shaft 20. Mounted on the shaft 20 adjacent the bearing 21 is a rotor to which a cylindrical permanent magnet 17 is attached. Thus, the permanent magnet 17 encircles the magnetic cores 18 and extend adjacent the interior wall of the rear casing portion 16'. Magnetic sensors 22 and 22' are located on the interior wall of the rear casing portion 16' adjacent the end of the permanent magnets 17 and arcuately spaced at a proper angle considering the polar arrangement of the rotor. On the opposite side of the interior wall of the rear casing portion 16', a magnetic control circuit board 23 is installed, and is enclosed by a rear end wall 16" of the rear casing portion 16'.

Figure 4B:
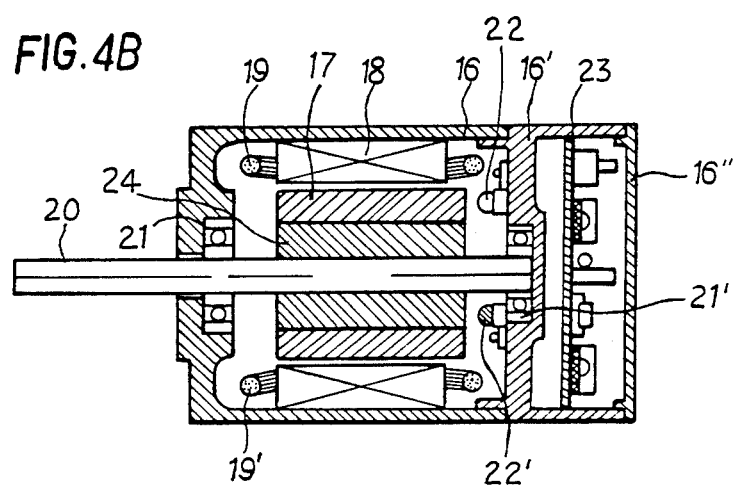
FIG. 4B is a cross-sectional side view of an electric motor similar to the motor shown in FIG. 2B.

A brushless unequal-pole electric motor, similar to the motor shown in FIG. 2B and based on the above described principles, is shown in FIG. 4B. Field magnetic cores 18 which are adapted to receive field coils 19 are fixedly installed on the inner circumferential surface of a front casing portion 16. Bearings 21 and 21' are fitted to the centers of the front end wall of the front casing portion 16 and an interior wall of a rear end portion 16' to rotatably support a shaft 20. A cylindrical rotor core 24 is mounted on the shaft 20 and a cylindrical permanent magnet 17 is attached around the core 24. Thus, the permanent magnet 17 and the rotor core 24 form the rotor, and a pair of magnetic sensors 22 and 22' are attached on the interior wall of the rear casing portion 16' adjacent and end of the magnets 17 and arcuately spaced at a proper angle considering the polar arrangement of the rotor. A magnetic control circuit board 23 is installed in the casing portion 16' and is enclosed with a rear end wall 16".

In the embodiment described above, if the required motor 20 is small in size, then the rotor core 24 can be removed, and the permanent magnet 17 can be directly mounted on the shaft 20. In the cases of medium sized or large sized motors, the rotor core 24 can be provided inside the permanent magnet 17 for economical considerations, the material of the rotor core being such as aluminum and the like.

The present invention concerns a brushless unequal-pole electric motor having a hollow cylindrical rotor rotatably mounted within a casing and including a permanent magnet, a plurality of field magnetic cores provided with field coils and located arcuately within and fixedly attached to the casing for generating magnetic fields of different magnitudes between adjacent ones of the field magnetic cores, and for generating magnetic fields of the same magnitude between oppositely located ones of the field magnetic cores, magnetic sensors located within the casing for detecting the positions of the magnetic poles of the permanent magnet of the rotor, and a driving circuit connected to the magnetic sensors and to the field coils for reversing the magnetic polarity of the field magnetic cores in response to the magnetic sensors which detect the magnetic positions of the permanent magnet of the rotor.

As described above, the unequal-pole electric motor according to the present invention removes the commutator which has caused many problems in conventional motors, and the device of the present invention does not require a separate control inverter or the like which is required in an IC servo motor or a stepping motor. Further the electric motor according to the present invention is simple in its circuits, and can enclose all the required circuits within f the motor. Further the electric motor according to the present invention is very simple in its structure, and uses only the components such as magnetic sensors and gate elements which are commercially available, thereby keeping the manufacturing cost at a low level. Further the electric motor according to the present invention does not require frequent maintenance work, and therefore, can be reliably used in various automated apparatuses.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brushless unequal-pole electric motor comprising:
    a hollow cylindrical rotor rotatably mounted within a casing and including a permanent magnet having at least two magnetic pole;
    a plurality of field magnetic cores provided with field coils and located arcuately within and fixedly attached to said casing for generating magnetic fields of different magnitudes between adjacent ones of said field magnetic cores, and for generating magnetic fields of the same magnitude between oppositely located ones of said field magnetic cores;
    magnetic sensors located within said casing, each said sensor being arcuately spaced from a longitudinal axis of an adjacent one of said field magnetic cores for detecting the positions of the magnetic poles of said permanent magnet of said rotor; and
    a driving circuit connected to said magnetic sensors and to said field coils for reversing the magnetic polarity of said field magnetic cores in response to said magnetic sensors which detect the magnetic position of said permanent magnet of said rotor.

2. The brushless unequal-pole electric motor according to claim 1 wherein said field magnetic cores are of different sizes for generating magnetic fields of different magnitudes.

3. The brushless unequal-pole electric motor according to claim 1 wherein said field coils are of different volumes for generating magnetic fields of different magnitudes.

4. The brushless unequal-pole electric motor according to claim 1 wherein said magnetic sensors are position detecting sensors.

5. The brushless unequal-pole electric motor according to claim 1 wherein said field magnetic cores are positioned inside said rotor and are fixedly attached to said casing.

6. The brushless unequal-pole electric motor according to claim 1 wherein said field magnetic cores are positioned about said rotor and are fixedly attached to said casing.

7. The brushless unequal-pole electric motor according to claim 1 wherein said driving circuit includes for each said field coil two pairs of switching gates, each said switching gate of each said pair connected to an opposite end of an associated said field coil, and a pair of trigger gates, each said trigger gate connected to one of said pairs of switching gates and to one of said magnetic sensors for controlling said one pair of switching gates to connect said associated field coil to a source of electric power.

8. The brushless unequal-pole electric motor according to claim 1 wherein said driving circuit is located inside said casing.

9. THe brushless unequal-pole electric motor according to claim 1 wherein said magnetic sensors are a pair of magnetic sensors proximate an adjacent pair of said field magnetic cores, each said magnetic sensor being arcuately spaced from a longitudinal axis of an associated one of said pair of field magnetic cores and approximately ninety degrees from the other one of said magnetic sensors.

10. A brushless unequal-pole electric motor comprising:
    a hollow cylindrical rotor rotatably mounted within a casing and including a permanent magnet having at least tow magnetic poles;
    a plurality of field magnetic cores provided with field coils and located arcuately within said rotor for generating magnetic fields of different magnitudes between adjacent ones of said field magnetic cores, and for generating magnetic fields of the same magnitude between oppositely located ones of said field magnetic cores;

magnetic sensors located within said casing for detecting the positions of the magnetic poles of said permanent magnet of said rotor; and a driving circuit connected to said magnetic sensors and to said field coils for reversing the magnetic polarity of said field magnetic cores in response to said magnetic sensors which detect the magnetic positions of said permanent magnet of said rotor.

11. A brushless unequal-pole electric motor comprising:

a hollow cylindrical rotor rotatably mounted within a casing and including a permanent magnet having at least two magnetic poles;

a plurality of field magnetic cores provided with field coils and located arcuately about said rotor for generating magnetic fields of different magnitudes between adjacent ones of said field magnetic cores, and for generating magnetic fields of the same magnitude between oppositely located ones of said field magnetic cores;

magnetic sensors located within said casing for detecting the positions of the magnetic poles of said permanent magnet of said rotor; and a driving circuit connected to said magnetic sensors and to said field coils for reversing the magnetic polarity of said field magnetic cores in response to said magnetic sensors which detect the magnetic positions of said permanent magnet of said rotor.

* * * * *